(12) United States Patent
Shaft et al.

(10) Patent No.: US 7,817,136 B2
(45) Date of Patent: Oct. 19, 2010

(54) DEAD FRONT MOUSE

(75) Inventors: David Shaft, Cork (IE); Francois Scholder, Rolle (CH); Jason Lee, HsinChu Hsien (TW); Niall White, Golden (IE)

(73) Assignee: Logitech Europe S.A. (CH)

( * ) Notice: Subject to any disclaimer, the term of this patent is extended or adjusted under 35 U.S.C. 154(b) by 914 days.

(21) Appl. No.: 11/356,386

(22) Filed: Feb. 15, 2006

(65) Prior Publication Data

US 2007/0188456 A1    Aug. 16, 2007

(51) Int. Cl.
*G09G 5/08* (2006.01)
*G06F 3/033* (2006.01)

(52) U.S. Cl. .................................. 345/163; 345/156
(58) Field of Classification Search ............ 45/156–184
See application file for complete search history.

(56) References Cited

U.S. PATENT DOCUMENTS

| 4,447,692 | A | 5/1984 | Mierzwinski |
| 6,417,843 | B1 * | 7/2002 | Stephens et al. ............ 345/167 |
| 7,136,045 | B2 * | 11/2006 | Rosenberg et al. ......... 345/163 |
| 2004/0189604 | A1 | 9/2004 | Lee |
| 2005/0117130 | A1 | 6/2005 | Bohn et al. |
| 2005/0181180 | A1 * | 8/2005 | Athanas et al. ............. 428/172 |

FOREIGN PATENT DOCUMENTS

| EP | 0809420 A1 | 11/1997 |
| GB | 2343933 A | 5/2000 |
| JP | 08-137487 | 5/1996 |
| WO | WO 9918590 A | 4/1999 |
| WO | WO 01/33540 A1 | 5/2001 |
| WO | WO 0215210 A1 | 2/2002 |

OTHER PUBLICATIONS

German Patent & Trademark Examination Report 10 2007 007 109.6 dated Mar. 4, 2008.
German Office action for Application No. 102007007109.6 mailed on Nov. 25, 2009; 9 pages.
International Search Report PCT/IB0101333 mailed on Feb. 29, 2002, pp. 3.

* cited by examiner

*Primary Examiner*—Srilakshmi K Kumar
(74) *Attorney, Agent, or Firm*—Townsend and Townsend and Crew LLP

(57) ABSTRACT

A mouse configured to display an icon including a top housing that is semi-opaque; and an icon indicator disposed under the top housing, the icon indicator including a light source and an icon plate. The light source is configured to light the icon plate to display an icon through the top housing. The icon indicator and icon are substantially not visible through the top housing if the light source is not lighted.

23 Claims, 6 Drawing Sheets

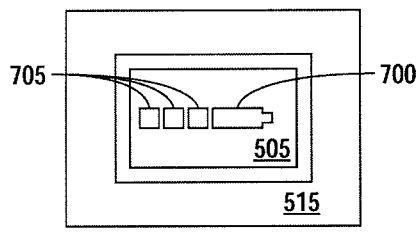 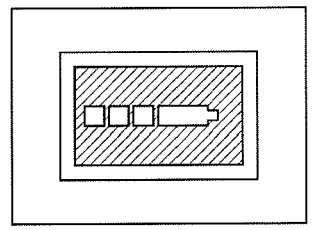
FIG. 7A                FIG. 7B
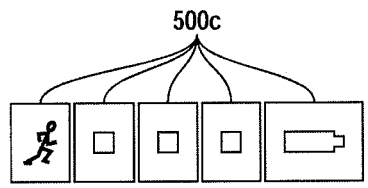
FIG. 7C
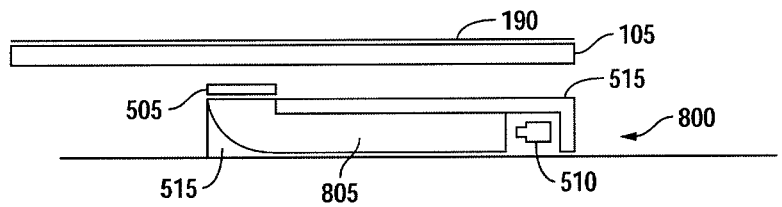
FIG. 8
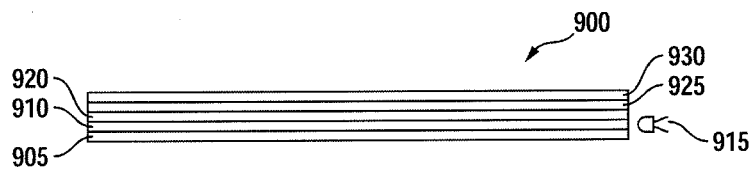
FIG. 9
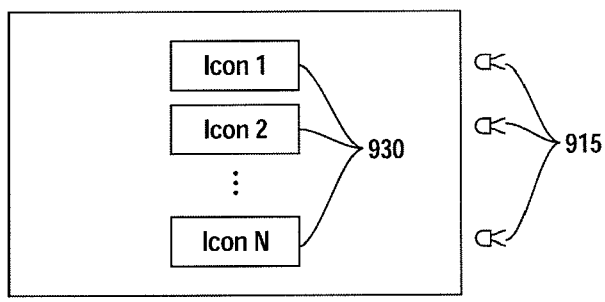
FIG. 10

DEAD FRONT MOUSE

BACKGROUND OF THE INVENTION

The present invention generally relates to an input device, such as a mouse, and more particularly relates to a mouse that includes a dead front display.

Input devices for computers and the like typically include mice, keyboards, joysticks, touch pads and the like for computer control. These input devices are typically used to control computer applications that typically include graphical objects that may be manipulated by the input device. Typical input devices often include one or more buttons and a roller for computer control. Traditional input devices do not provide information to the user for an operation mode the input device is operating in.

New mice are needed that provide information for an operation mode in which the control device is operating.

BRIEF SUMMARY OF THE INVENTION

The present invention generally provides an input device, such as a mouse, and more particularly provides a mouse that includes a dead front display.

According to one embodiment, the mouse includes a top housing that is semi-opaque; and an icon indicator disposed under the top housing. The icon indicator includes a light source and an icon plate. The light source is configured to light the icon plate to display the icon through the top housing. The icon indicator and/or icon are substantially not visible through the top housing if the light source is not lighted. According to a specific embodiment, the top housing has a transmittance of about five percent or less. The combination of the icon and/or the icon indicator not being visible through the semi-opaque top housing if the icon indicator is not lighted, and the visibility of the icon through the top housing if the icon indicator is lighted is generally referred to herein as "dead front."

According to another embodiment, the mouse includes a top housing that in turn includes a set of control button, wherein the top housing is semi-opaque; and an icon indicator disposed under the top housing. The icon indicator includes i) a light source, ii) an icon plate, iii) a light pipe configured to direct light from the light source to the icon plate, and iv) a light shield configured to block light traveling away from the icon plate. If the light source is lighted, the light source is configured to light the icon plate to display an icon through the top housing. If the light is not lighted the icon indicator and icon are substantially not visible through the top housing. According to a specific embodiment, the icon indicator is disposed under one of the control buttons. According to another specific embodiment, the mouse might include a motion detector configured to control a function associated with the icon if the mouse is moved in a predetermined motion. The icon might be a volume icon, and the predetermined motion might be up and/or down.

According to another embodiment, the mouse includes left and right control buttons; a middle control button disposed between the left and right control buttons; a switch disposed under the middle control button and configured to be activated if the middle control button is pressed; and a touch pad disposed under the middle control button and configured to detect movement of an object on a top surface of the middle control button.

According to another embodiment, the mouse includes a top housing that is substantially opaque; and an icon indicator disposed under the top housing. The icon indicator includes i) an icon plate that includes a plurality of icons thereon and includes a set of light baffles, and ii) a plurality of light sources that respectively correspond to the plurality of icons. The icon plate is configured to direct light from a given one of the light sources to a given one of the icons associated with the given light source. The light baffles are configured to block light from illuminating others of the icons not associated with the given light source. Each light source is configured to light an associated icon plate to display the icon on this icon plate through the top housing. The icon indicators and/or icons are substantially not visible through the top housing if the light sources are not lighted.

A better understanding of the nature and advantages of the present invention may be gained with reference to the following detailed description and the accompanying drawings.

BRIEF DESCRIPTION OF THE DRAWINGS

FIG. 7A is a simplified schematic of icons and its associated icon plates that might be included in icon indicator according to one embodiment of the present invention;

FIG. 7A is a simplified schematic of icons and its associated icon plates that might be included in icon indicator according to another embodiment of the present invention;

FIG. 7C is a simplified schematic of a top view of a number of icon indicators;

FIG. 8 is a simplified schematic of an icon indicator according to another embodiment of the present invention;

FIGS. 9 and 10 are respective side and top view of an icon indicator according to another embodiment of the present invention;

DETAILED DESCRIPTION OF EXEMPLARY EMBODIMENTS

Figure 1:
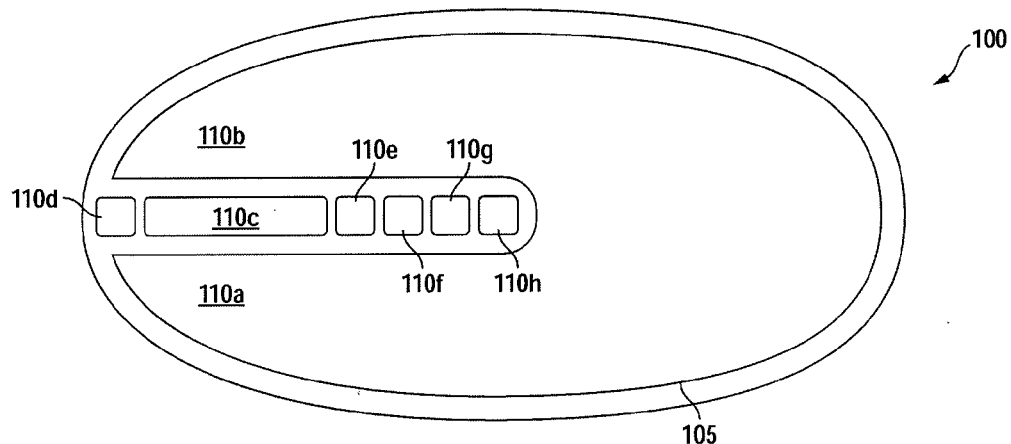
FIG. 1 is a simplified schematic of a mouse having a top housing and a set of control buttons according to one embodiment of the present invention.

FIG. 1 is a simplified top view of a mouse 100 having a top housing 105 and a set of control buttons 110. A set as referred to herein may include one or more members. According to one embodiment, the set of control buttons 110 includes a left control button 110a, a right control button 110b, and a middle control button 110c. According to some embodiments, the mouse includes control buttons 110d-110h. It should be understood that the elements shown in the various figures may not be drawn to scale, but may be scaled for convenience to add clarity to the figures and the description thereof. Mouse 100 may be configured to control a computer, a set top box, a laptop computer, a palm top computer or the like.

Figure 2:
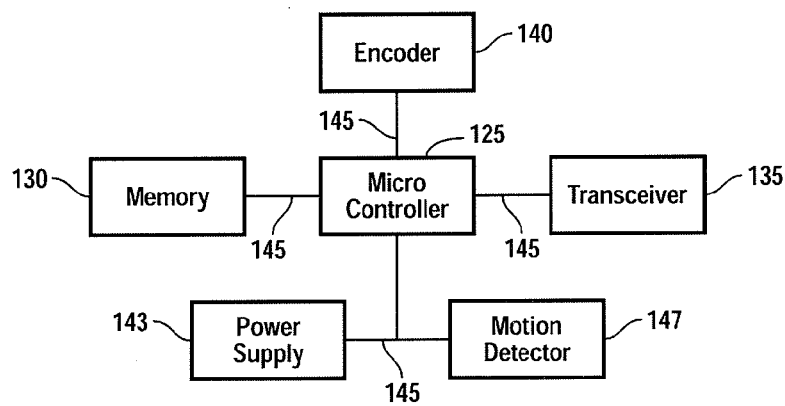
FIG. 2 is a simplified schematic of a control system of the mouse.

FIG. 2 is a simplified schematic of a control system 115 of mouse 100. Control system 100 may be a printed circuit board (PCB) that includes a power source 120 configured to power a micro controller 125, a memory 130, a transmitter (or transceiver) 135 that is configured to communicate with the computer or the like, a detection and encoder circuit 140, a power supply 143, and a bus 145 that may communicatively couple these devices. The PCB might also include a motion detector 147 that is configured to detect movement of the mouse. For example, the motion detector might be configured to detect the mouse being lifted from the surface of a table or the like. The motion detector might also be configured to detect left or right motion (lateral motion and/or pivot motion) of the mouse. The motion detector might be configured to detect up or down motion of the mouse, or may be configured to detect other motions, such as diagonal motions, arc motions, circular motions or the like. The motion detector might include one or more tuning fork type motion detectors, one or more gyroscopic type detectors (e.g., Coriolis force detectors), one or more accelerometers, one or more magnetometers (e.g., manufactured by Hillcrest Laboratories Inc. of Rockville Md.) or the like. The PCB may include other electronic modules as will be well know by those of skill in the art.

The left and right control buttons may be configured for traditional use, such as for launching a drop down menu, selecting a screen item or the like. According to one embodiment the left and right control buttons are cantilever mounted to the top housing. The left control button may be configured to flex at a hinge point (e.g., at approximately the cantilever mount portion of the button) under a user pressing force to activate a switch 155a (see FIG. 3A) disposed under the button. The switch may be disposed at an approximately midpoint of the left control button. The left control button may be relatively thin and may be configured to flex in a central potion 160a if, for example, the user presses the button at the central portion. For example, if the left control button is attached to the front of the mouse body, the button might flex in the middle if a user presses on the button. The right control button is similarly configured to the left control and may be configured to flex at a hinge points (e.g., at approximately the cantilever mount portion of the button) under a user pressing force to activate a switch (not shown) disposed under a central portion of the button. To effect flexure in the middle portions of the left and right control buttons, these buttons may be fabricated from relatively thin plastic, such as plastic that is approximately 0.2 millimeters to approximately 0.05 millimeters thick.

Figure 3A:
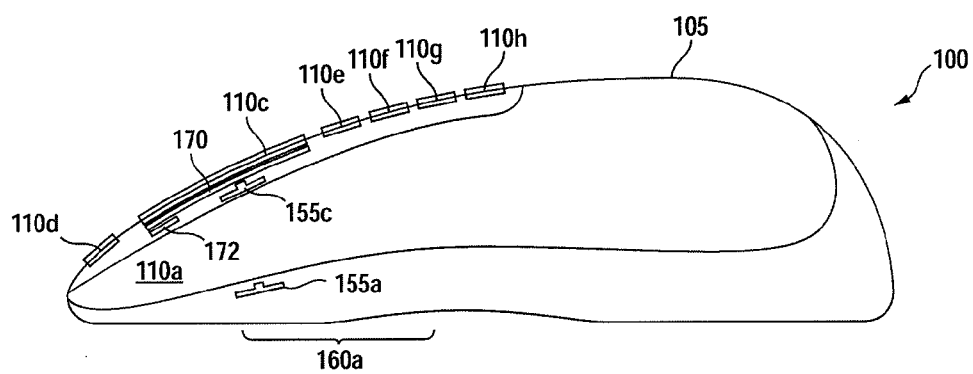
FIG. 3A is a simplified cross-sectional view of the mouse from a side of the mouse.
Figure 3B:
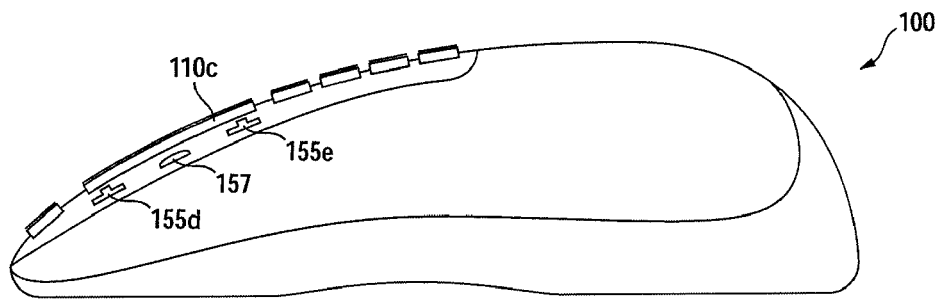
FIG. 3B is a simplified cross-sectional view of the mouse from a side of the mouse according to another embodiment of the present invention.

According to one embodiment, the middle control button 110c is configured to be pressed to activate a switch 155c that is disposed under the control button. Activation of switch 155c may be configured to effect functions similar to those of a traditional mouse scroll wheel being pressed, such changing the mouse scroll wheel functions and the like. The middle control button is further configured to be touched by a user as the user slides her finger across the control button to perform the scroll wheel functions of a traditional mouse scroll wheel, such as document scrolling, enlarging and or reducing a document, scrolling through drop down windows and the like. FIG. 3B is a simplified schematic of another embodiment of the mouse that includes a middle control button 110c that is configured to rock on a rocker support 157 to activate a front switch 155d or a back switch 155e.

According to one embodiment of the present invention, the middle control button is coupled to a touch pad 170 that is configured to detect the movement of a user's finger across the middle control button as the user slides her finger across the button. The mouse is configured to encode the user's touch on the touch pad to generation scroll wheel type commands, such as those described above and those that are well known to those of skill in the art.

According to one embodiment, a vibration device 172 (i.e., a haptic feedback device) is coupled to the middle control button and/or to the touch pad. The vibration device may be of the type used in cell phones, pagers, a solenoid and the like to vibrate these devices on the receipt of an incoming telephone call or the like. According to one embodiment, as the user moves her finger along the middle control button, and as the touch pad detects this movement, the touch pad may be configured to single the vibration device to vibrate and thereby provide tactile feedback to the user that her touch on the button is being detected and encoded. While the vibration device is shown in FIG. 3A as being coupled to a front portion of the middle control button, the vibration device may be coupled to other portions of the middle control button or to other portions of the mouse.

Figure 4A:
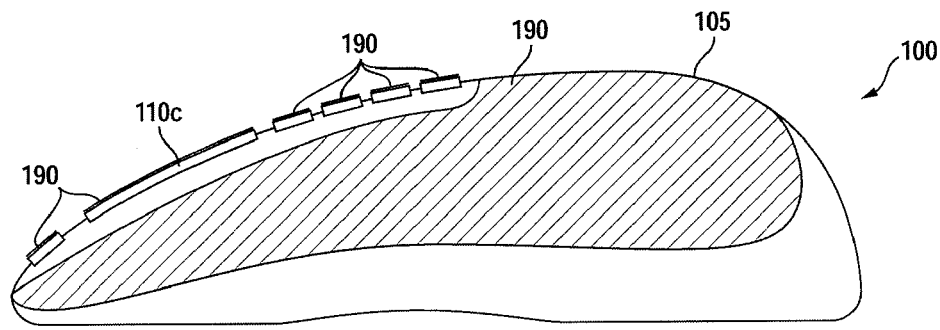
FIG. 4A is a simplified side view of the mouse with a coating applied to the top housing and/or the control buttons.

According to one embodiment, the top housing and the control buttons are substantially opaque (sometimes referred to herein as semi-opaque). For example, the top housing and the control buttons are configured to block about 95% or more of the light passing trough the top housing and the control buttons. Alternatively stated, the transmittance of the top housing and control buttons may be about 5% or less. As the transmittance is substantially low (e.g., about 5% or less), light entering from the top of the top housing and control buttons will substantially not be reflected back from the interior structures under the top housing and buttons and will therefore not permit a user to see substantially any of these interior structures. However, light from a light source under the top housing and/or the control buttons will pass through the top housing and/or control buttons, such that this light will be visible to a user. According to one embodiment, the plastic from which the top housing and the control buttons are formed have the described substantial opacity (or transmittance). According to another embodiment, a coating 190 (see FIG. 4A) is applied to the top housing and/or the control buttons that has the foregoing described opacity. While coating 190 is shown if FIG. 4A as being on the top surface of the top housing and the control buttons, the coating may be applied to the bottom surface of the top housing and the control buttons. The coating may alternatively be applied to both the top surfaces and the bottom surfaces of the top housing and the control buttons. According to one embodiment, the coating is paint and may be sprayed or otherwise applied to the top housing and the control buttons.

Figure 4B:
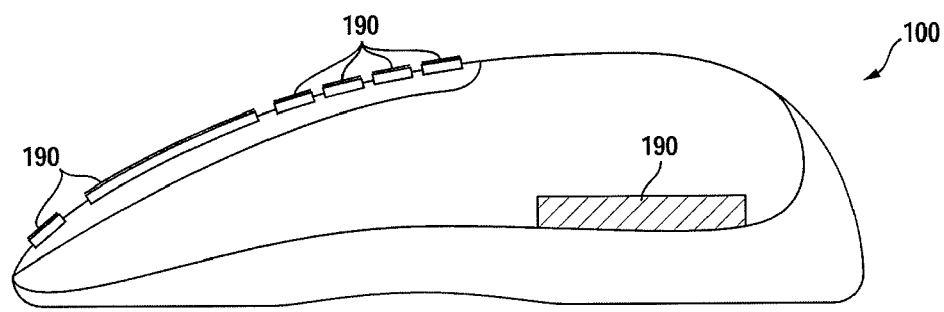
FIG. 4B is a simplified schematic showing that the optical coating is applied to a limited portion of the top housing according to one embodiment of the present invention.

FIG. 4B is a simplified schematic showing that the optical coating 190 is applied to a limited portion of the top housing according to one embodiment of the present invention. The limited portion may be an integrated piece of the top housing or may be in inserted portion of the top housing, such as an inserted piece of plastic that is not integrally formed with the remainder of the top housing.

Figure 5A:
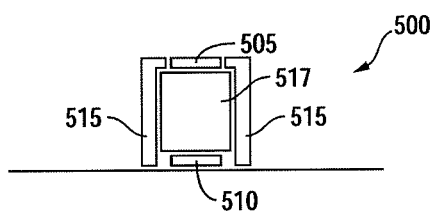
FIG. 5A is a simplified side view of an icon indicator according to one embodiment of the invention.
Figure 5B:
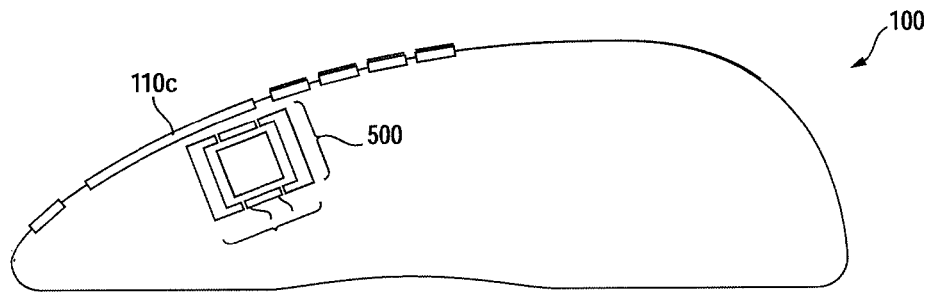
FIG. 5B is a simplified side view of the mouse having icon indicator disposed therein.
Figure 5C:
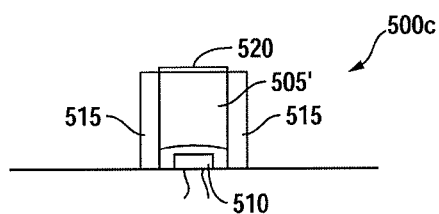
FIG. 5C is a simplified schematic of an icon indicator that includes an icon indicator that is a light pipe.
Figure 5D:
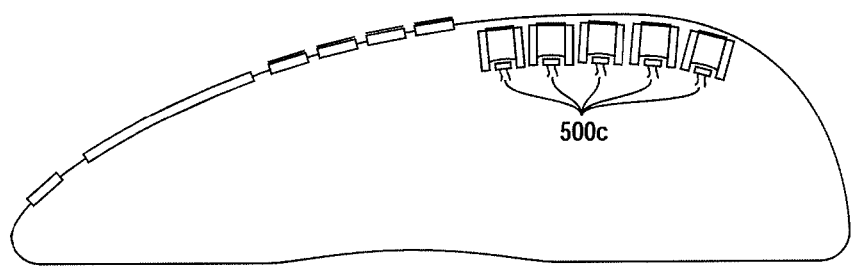
FIG. 5D is a cross-section view of the mouse wherein the mouse includes a plurality of icon indicators shown in FIG. 5D.

According to one embodiment, at least one of the control buttons includes an icon indicator disposed under this control button and is configured to be lighted to convey operation mode information or the like to the user. The operation mode information may indicate a particular function that a control button is configured to effect if the button is pressed or touched. If the operation mode information is not displayed by the icon indicator, the control button may be configured to effect a function not associated with the icon indicator. Examples of such function controls and icon indicators are described in further detail below. FIG. 5A is a simplified side view of an icon indicator 500 according to one embodiment of the invention; and FIG. 5B is a simplified side view of mouse 100 having icon indicator 500 disposed therein. The left control button is not shown in FIG. 5B for convenience. Various icon indicators may be disposed under or below the control buttons and/or the top housing. The word "below" as referred to herein may include a first element disposed adjacent to a second element, and in a lower position than the second element. According to one embodiment, icon indicator 500 includes an icon plate 505, a light source 510, and a light shield 515. According to a specific embodiment of the invention, the icon indicator includes a light pipe 517 configured to direct light from the light source through the icon plate. According to one embodiment, the icon indicator does not include a light pipe, and light from the light source may be transmitted directly to the icon plate. The light source might be an LED, a light bulb, an electroluminescent device or the like. FIG. 5C is a simplified schematic of an icon indicator 500' that includes an icon indicator 505' that is a light pipe. Icon indicator 505' includes an icon 520 that may be disposed on the top surface of the icon plate or may be molded into the icon plate as will be discussed in further detail below. FIG. 5D is a cross-section view of the mouse wherein the mouse includes a plurality of icon indicators 505'. The LEDs of these icon indicators might be single color LEDs or multi-color LEDs to display the icons of the icon indicators in a variety of colors. While the mouse in FIG. 5D is shown with multiple icon indicators 500', the mouse may includes other icon indicators described herein.

Figure 6:
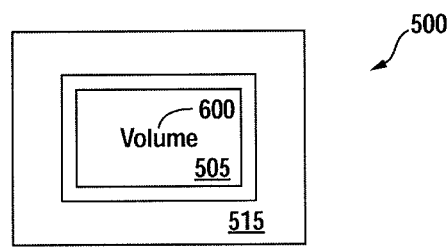
FIG. 6 is a top view of an icon indicator according to one embodiment of the invention.

FIG. 6 is a top view of icon indicator 500 according to one embodiment of the invention. The icon plate includes an icon 600 thereon to present the operation information to the user if the light is lighted. Icon as referred to herein may include a set of graphics, one or more words or a combination thereof. For example, the icon might include the word music, volume, word processing, spell, mail, or nearly any information that might be conveyed about the operation mode of the mouse. As shown in FIG. 7A, the icon might include a battery 700 with a series of charge level indicators 705. Such a battery charge indicator might be disposed under a portion of the top housing to indicate the amount of charge left on the mouse's power supply 143 (see FIG. 2). According to one embodiment, a number of icon indicators may be disposed under or below the control buttons. For example, if the mouse is a gaming mouse, the icons associated with the various control buttons might include: play, restart, fire, jump, or other icons relevant to computer gaming or the like. The light sources may be lighted based on a variety of condition. The light sources may be controlled to light by the various computer programs being run by a computer the mouse is controlling. For example, if the user uses the mouse for controlling a computer game running on the computer, then the light sources might be lighted to indicate the function of one or more of the control buttons for game playing. More specifically, the computer program running on the computer might direct the computer to transmit a control command to the mouse's transceiver and processor, which in turn directs the light source to light. According to another example, if the user uses the mouse to control a word processing program, then the icons of the icon sources might indicate word processing functions of the various control buttons, such as spell, cut, copy, paste, etc. The foregoing are example of computer applications that might be configured to light the icon sources for display of various operation modes of the mouse and the control buttons and should not be viewed as limiting the embodiments of the invention of the appended claims.

According to one embodiment, the top surface or the bottom surface of the icon plate is coated with a substantially opaque material, such as black paint 705 (see FIG. 7B) and the icon is laser etched (sometimes referred to herein as laser ablated) into the black paint (indicated by cross hatching in FIG. 7B). Laser etching provides that icons may be relatively small but with crisp boundaries so that the icons are discernable by the user. The icons may be placed on the icon plate shield by other methods such as lithography, printing, chemical etching or the like. According to one embodiment, the icons are molded into the icon plate. For example, the central portion of the icon plate that includes the icon may be transparent and the outer portion may be opaque. Or the control portion of the icon plate may be opaque and the outer portion may be transparent.

FIG. 7C is a simplified schematic of a top view of a number of icon indicators, such as icon indicators 500c. Each of the middle icons may be configured to be lighted by two colors. The middle icons may be lighted with a light color (e.g., green) to match a green color of one of the end icons, such as the running man icon to indicate a speed factor of the mouse or the like. The middle icons may be lighted with another light color (e.g., red) to match a red color of the other end icon, the battery, to indicate the remaining power of the batter. The icon indicators may be disposed under a top housing shown in FIG. 4A that includes a substantially continuous coating, or may be disposed under the limited portion of the coated housing shown in FIG. 4B.

FIG. 8 is a simplified schematic of an icon indicator 800 configured for use with mouse 100 according to another embodiment of the present invention. The numeral scheme used above to identify elements of icon indicator 500 is used to identify the same or similar elements of icon indicator 800. Icon indicator 800 differs from icon indicator 500 in that icon indicator 800 includes a laterally disposed light pipe 805 that is configured to direct light laterally and upward from light source 510 to icon plate 505. According to one embodiment, light shields 515 are opaque to prevent light from escaping from the light shield other than the icon plate. The light pipe and light shields may be duel injection molded or formed by other methods. According to one embodiment, the light pipe my include particles suspended therein to diffuse the light traveling through the light pipe.

FIGS. 9 and 10 are respective side and top view of an icon indicator 900 according to another embodiment of the present invention. The icon indicator 900 includes a bottom reflective layer 905, a light pipe layer 910, a light source 915 (e.g., a LED), first and second light collimating layers 920 and 925, and a top reflective layer 930 that includes one or more icon 930 formed thereon, for example via a laser etched coating, molded plastic or the like as described above. The light pipe layer is configured to spread the light from the LED, and the collimating layers are configured to direct light that is traveling in direction other than upward into an upward direction to illuminate the top reflective layer. The top reflective layer may have a transmittance of about 10% or less, and according to a particular embodiment of about 5% or less. Icon indicator 900 may be disposed in a mouse as described above or in other types of control devices. According to one embodiment, the light pipe layer and LED may substituted with an electroluminescent layer.

Figure 11:
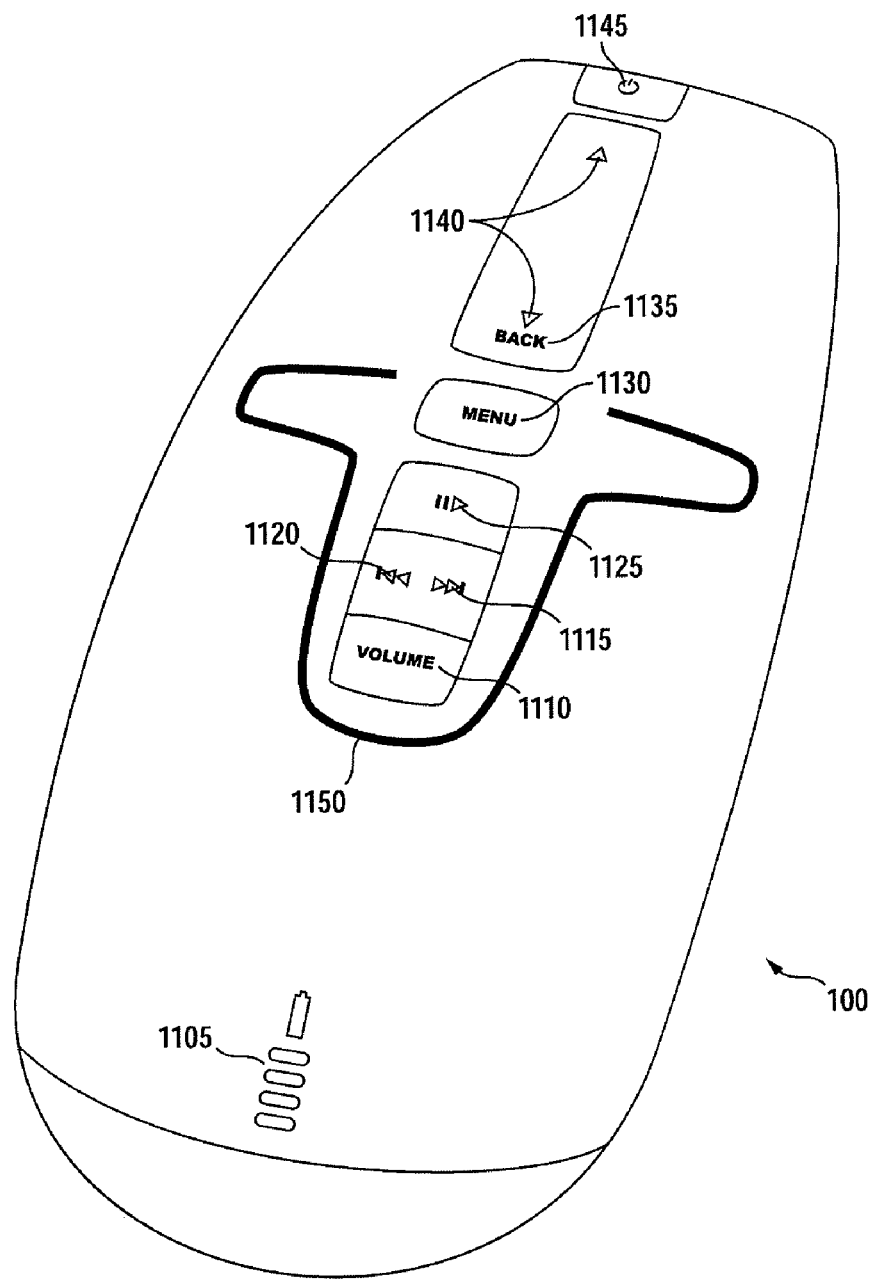
FIG. 11 is a simplified schematic of mouse wherein a number of icon indicators are lighted according to one embodiment of the present invention.

FIG. 11 is a simplified schematic of mouse 100 wherein a number of icon indicators are lighted according to one embodiment of the invention. The icon indicators include a battery icon and battery power level icons 1105, a volume icon 1110 for a control button configured for volume control, a fast forward icon 1115, a reverse icon 1120, a play-pause icon 1125, a menu icon 1130, a back icon 1135, scroll icons 1140, and a power icon 1145. The mouse might also includes an icon indictor for a decorative icon 1150. The icons in the particular embodiment of the mouse shown in FIG. 11 might be associated with the mouse entering a entertain control mode, such as for controlling a media player operating on the computer. According to one embodiment, if the volume icon is lighted, and the control button associated with the volume icon is pressed, the motion detector is activated and up or down movement and/or up or down tilt of the mouse well effect volume control of the computer or other device the mouse is configured to control. If these icons are not lighted, then the icons will not be visible to the mouse user. According to one embodiment, if the icons are not lighted, then the functions of the control buttons are associated with functions other than those function associated with the icons.

Figure 12:
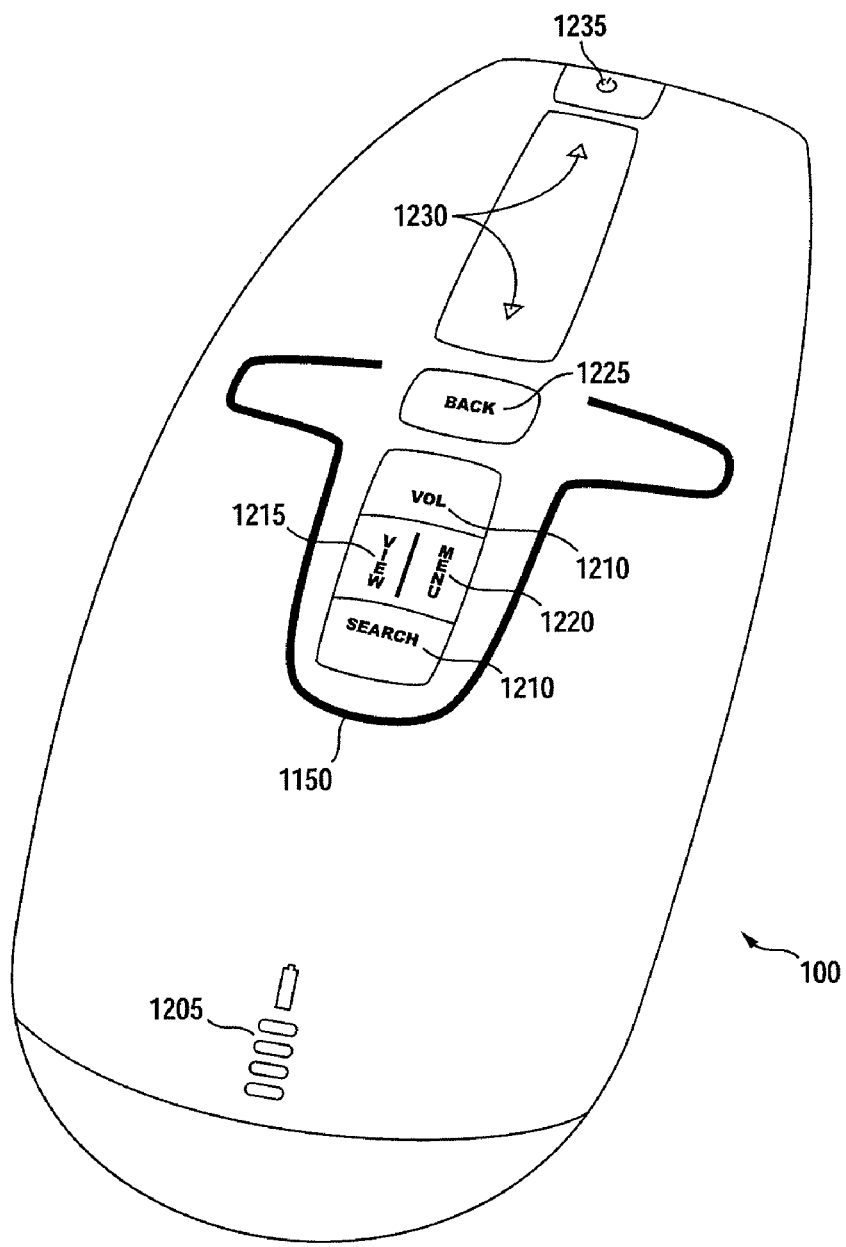
FIG. 12 is a simplified schematic of mouse wherein a number of icon indicators are lighted according to another embodiment of the present invention.

FIG. 12 is a simplified schematic of mouse 100 wherein a number of icon indicators are lighted according to another embodiment of the invention. The icons includes a battery icon and battery power level icons 1205, the volume ("vol") icon 1210, a view icon 1215, a menu icon 1220, a back icon 1225, scroll icons 1230, a power icon 1235, and a decorative icon 1240. It should be understood that the icons shown in FIGS. 11 and 12 are exemplary and that mouse 100 may be configured to display other icons.

According to one embodiment, the top surface of an icon plate may be curved in one or two dimension to that the curve of the top surface substantially matches the interior curved surface of the top housing or a control button. For example, the top surface of the icon plate associated with battery icon and the battery power level icons 1105 may be complimentary curved to substantially match the interior curve of the rear portion of the top plate.

It is to be understood that the exemplary embodiments described above are for illustrative purposes only and that various modifications or changes in light thereof will be suggested to persons skilled in the art and are to be included within the spirit and purview of this application and scope of the appended claims. For example, while dead front embodiments for mice have been described, dead front embodiment may also be used in keyboards, game controllers, joy sticks, remote controls and other control devices. Therefore, the above description should not be understood as limiting the scope of the invention as defined by the claims.

What is claimed is:

1. A mouse configured to display an icon comprising:
a top housing that is semi-opaque;
an icon indicator disposed under the top housing, the icon indicator including a light source and an icon plate, wherein the light source is configured to light the icon plate to display an icon through the top housing, and wherein the icon indicator and icon are substantially not visible through the top housing if the light source is not lighted; and
a processor configured to send a control signal to the light source to turn on or off the light source; and
wherein:
the top housing includes a control button and the icon indicator is disposed under the control button,
in a lighted state of the light source the icon indicator indicates a first function of the control button, and
in non-lighted state of the light source the control button has a second function different from the first function.

2. The mouse of claim 1, wherein the top housing has a transmittance of about five percent or less.

3. The mouse of claim 1, wherein the icon indicator further includes an icon plate on which the icon is disposed.

4. The mouse of claim 3, wherein the icon is a transparent portion of the icon plate and a portion of the icon plate surrounding the icon is substantially not transparent.

5. The mouse of claim 3, wherein the icon is a substantially not transparent portion of the icon plate and a portion of the icon plate surrounding the icon is transparent.

6. The mouse of claim 3, wherein the icon plate includes a coating with the icon formed in the coating.

7. The mouse of claim 6, wherein the coating is disposed on a top surface or a bottom surface of the icon plate.

8. The mouse of claim 7, wherein the coating is paint.

9. The mouse of claim 8, wherein the icon is laser etched in the paint.

10. The mouse of claim 1, wherein the icon indicator further includes a light pipe disposed between the light source and the icon plate.

11. The mouse of claim 1, wherein the top housing includes at least one control button.

12. A mouse configured to display an icon comprising:
a top housing including a set of control button, wherein the top housing is semi-opaque; and
an icon indicator disposed under the top housing, the icon indicator including a light source;
an icon plate;
a light pipe configured to direct light from the light source to the icon plate;
a light shield configured to block light traveling away from the icon plate; and
a processor configured to send a control signal to the light source to turn on or off the light source,
wherein:
the top housing includes a control button and the icon plate is disposed under the control button,
if the light source is lighted, the light source is configured to light the icon plate to display an icon through the control button to indicate a first function of the control button, and
if the light source is not lighted the icon plate and the icon are substantially not visible through the top housing and the control button has a second function different from the first function.

13. The mouse of claim 12, wherein the processor is configured to send the control signal to the light source to light the light source in response to a received command from computer code executed by a computer that the mouse is configured to control.

14. The mouse of claim 12, further comprising a motion detector configured to control a function associated with the icon if the icon is lighted and if the mouse is moved in a predetermined motion.

15. The mouse of claim 14, wherein the icon is a volume icon.

16. The mouse of claim 15, wherein the predetermined motion is up and/or down.

17. The mouse of claim 12, wherein the light source is laterally disposed with respect to the icon plate and the light pipe is configured to direct the light laterally from the light source and the icon plate.

18. The mouse of claim 12, wherein the light pipe includes diffusing particles to defuse the light in the light pipe.

19. A mouse configured to display an icon comprising:
left and right control buttons;
a middle control button disposed between the left and right control buttons;
a switch disposed under the middle control button and configured to be activated if the middle control button is pressed;
a touch pad disposed under the middle control button and configured to detect movement of an object on a top surface of the middle control button;
at least one icon indicator including a light source both disposed under at least a given one of the left, right, and middle control buttons, wherein the icon indicator is configured to be lighted by the light source to project an icon onto an under surface of the given control button under which the icon indicator is located to project the icon through the given control button; and
a processor configured to send a control signal to the light source to turn on or off the light source,
wherein:
if the light source is lighted, the light source is configured to light the icon indicator to display an icon through the given control button to indicate a first function of the control button, and
if the light source is not lighted the icon indicator and icon are substantially not visible through the top housing and the control button has a second function different from the first function.

20. The mouse of claim 19, further comprising a haptic feedback device configured to provide haptic feedback if a the touch pad detects movement of the object.

21. The mouse of claim 20, wherein the haptic feedback include vibration.

22. The mouse of claim 21, wherein the haptic feedback device is a vibration device.

23. The mouse of claim 19, wherein the icon indicator includes:
an icon plate that has the icon formed thereon or therein,
a light pipe configured to direct light from the light source to the icon plate, and
a light shield configured to block light traveling away from the icon plate.

\* \* \* \* \*